(12) United States Patent
Sourav et al.

(10) Patent No.: US 11,765,619 B2
(45) Date of Patent: Sep. 19, 2023

(54) METHOD AND APPARATUS FOR MANAGING INTERNET PROTOCOL FLOW RECORDS IN A WIRELESS COMMUNICATION NETWORK

(71) Applicant: SIERRA WIRELESS, INC., Richmond (CA)

(72) Inventors: Sumit Sourav, Richmond (CA); Cuero Bugot, Castanet-Tolosan (FR); Peter John Owens, Port Moody (CA)

(73) Assignee: SEMTECH CORPORATION, Camarillo, CA (US)

( * ) Notice: Subject to any disclaimer, the term of this patent is extended or adjusted under 35 U.S.C. 154(b) by 0 days.

(21) Appl. No.: 17/005,537

(22) Filed: Aug. 28, 2020

(65) Prior Publication Data
US 2022/0070726 A1     Mar. 3, 2022

(51) Int. Cl.
| | |
|---|---|
| *H04W 28/06* | (2009.01) |
| *H04L 43/026* | (2022.01) |
| *H04W 24/08* | (2009.01) |
| *H04W 88/16* | (2009.01) |
| *H04L 61/4511* | (2022.01) |

(52) U.S. Cl.
CPC ........... *H04W 28/06* (2013.01); *H04L 43/026* (2013.01); *H04L 61/4511* (2022.05); *H04W 24/08* (2013.01); *H04W 88/16* (2013.01)

(58) Field of Classification Search
None
See application file for complete search history.

(56) References Cited

U.S. PATENT DOCUMENTS

| | | | |
|---|---|---|---|
| 2006/0165003 A1* | 7/2006 | Partridge | H04L 43/10 370/248 |
| 2016/0286001 A1* | 9/2016 | Chan | H04L 12/6418 |
| 2017/0359238 A1* | 12/2017 | Hughes | H04L 43/067 |
| 2018/0302306 A1* | 10/2018 | Carroll | H04L 41/14 |
| 2021/0266333 A1* | 8/2021 | Wright | H04L 63/1408 |

OTHER PUBLICATIONS

Boschi et al. RFC 5473, Reducing Redundancy in IP Flow Information Export (IPFIX) and Packet Sampling (PSAMP) Reports; Mar. 2009, 28 pages.

* cited by examiner

*Primary Examiner* — Noel R Beharry
*Assistant Examiner* — Pamit Kaur
(74) *Attorney, Agent, or Firm* — Perkins Coie LLP (57) ABSTRACT

There is provided a method and apparatus for management of internet protocol (IP) flow records in a wireless communication network. The method and apparatus can provide for the compression and aggregation of the IP flow records for subsequent transmission, thereby reducing bandwidth necessary for transmission thereof.

14 Claims, 5 Drawing Sheets

```
root@lexus-large:~# conntrack -Lni
udp 17 173 src=192.168.1.67 dst=192.168.1.254 sport=2007 dport=53 packets=79 bytes=5316
src=192.168.1.254 dst=192.168.1.67 sport=53 dport=2007 packets=79 bytes=10066 [ASSURED]
mark=0 qosconnmark=0x0 delta-time=25 use=1
tcp 6 4 ESTABLISHED src=192.168.2.10 dst=207.194.175.80 sport=58682 dport=443 packets=2
bytes=92 src=207.194.175.80 dst=192.168.1.67 sport=443 dport=58682 packets=1 bytes=52
[ASSURED] mark=0 qosconnmark=0x0 delta-time=6 use=1
tcp 6 4 ESTABLISHED src=192.168.2.10 dst=172.217.14.227 sport=58662 dport=443 packets=2
bytes=92 src=172.217.14.227 dst=192.168.1.67 sport=443 dport=58662 packets=1 bytes=52
[ASSURED] mark=0 qosconnmark=0x0 delta-time=23 use=1
tcp 6 4 ESTABLISHED src=192.168.2.10 dst=172.217.14.228 sport=58654 dport=443 packets=2
bytes=92 src=172.217.14.228 dst=192.168.1.67 sport=443 dport=58654 packets=1 bytes=52
[ASSURED] mark=0 qosconnmark=0x0 delta-time=25 use=1
udp 17 25 src=192.168.1.67 dst=95.216.24.230 sport=36168 dport=123 packets=1 bytes=76
src=95.216.24.230 dst=192.168.1.67 sport=123 dport=36168 packets=1 bytes=76 mark=0
qosconnmark=0x0 delta-time=5 use=1
tcp 6 4 ESTABLISHED src=192.168.2.10 dst=23.73.20.41 sport=58678 dport=443 packets=2
bytes=92 src=23.73.20.41 dst=192.168.1.67 sport=443 dport=58678 packets=1 bytes=52
[ASSURED] mark=0 qosconnmark=0x0 delta-time=7 use=1
tcp 6 4 ESTABLISHED src=192.168.2.10 dst=216.58.217.42 sport=58655 dport=443 packets=2
bytes=92 src=216.58.217.42 dst=192.168.1.67 sport=443 dport=58655 packets=1 bytes=52
[ASSURED] mark=0 qosconnmark=0x0 delta-time=24 use=1
tcp 6 4 ESTABLISHED src=192.168.2.10 dst=216.58.193.67 sport=58663 dport=443 packets=2
bytes=92 src=216.58.193.67 dst=192.168.1.67 sport=443 dport=58663 packets=1 bytes=52
[ASSURED] mark=0 qosconnmark=0x0 delta-time=17 use=2
tcp 6 4 ESTABLISHED src=192.168.2.10 dst=216.58.193.74 sport=58670 dport=443 packets=2
bytes=92 src=216.58.193.74 dst=192.168.1.67 sport=443 dport=58670 packets=1 bytes=52
[ASSURED] mark=0 qosconnmark=0x0 delta-time=8 use=1
tcp 6 4 ESTABLISHED src=192.168.2.10 dst=172.217.3.163 sport=58664 dport=443 packets=2
bytes=92 src=172.217.3.163 dst=192.168.1.67 sport=443 dport=58664 packets=1 bytes=52
[ASSURED] mark=0 qosconnmark=0x0 delta-time=15 use=1
tcp 6 4 ESTABLISHED src=192.168.2.10 dst=207.194.175.122 sport=58668 dport=443
packets=2 bytes=92 src=207.194.175.122 dst=192.168.1.67 sport=443 dport=58668 packets=1
bytes=52 [ASSURED] mark=0 qosconnmark=0x0 delta-time=8 use=1
tcp 6 4 ESTABLISHED src=192.168.2.10 dst=172.217.14.227 sport=58659 dport=443 packets=3
bytes=649 src=172.217.14.227 dst=192.168.1.67 sport=443 dport=58659 packets=1 bytes=52
[ASSURED] mark=0 qosconnmark=0x0 delta-time=24 use=1
tcp 6 4 ESTABLISHED src=192.168.2.10 dst=40.90.22.192 sport=58683 dport=443 packets=2
bytes=92 src=40.90.22.192 dst=192.168.1.67 sport=443 dport=58683 packets=1 bytes=52
[ASSURED] mark=0 qosconnmark=0x0 delta-time=6 use=1
tcp 6 4 ESTABLISHED src=192.168.2.10 dst=172.217.3.174 sport=58661 dport=443 packets=2
bytes=92 src=172.217.3.174 dst=192.168.1.67 sport=443 dport=58661 packets=1 bytes=52
[ASSURED] mark=0 qosconnmark=0x0 delta-time=24 use=1
tcp 6 4 ESTABLISHED src=192.168.2.10 dst=64.4.54.254 sport=58672 dport=443 packets=2
bytes=92 src=64.4.54.254 dst=192.168.1.67 sport=443 dport=58672 packets=1 bytes=52
[ASSURED] mark=0 qosconnmark=0x0 delta-time=8 use=1
udp 17 4 src=192.168.2.10 dst=172.217.14.228 sport=63130 dport=443 packets=1 bytes=1378
src=172.217.14.228 dst=192.168.1.67 sport=443 dport=63130 packets=2 bytes=2756
[ASSURED] mark=0 qosconnmark=0x0 delta-time=13 use=1
tcp 6 3 CLOSE src=192.168.2.10 dst=207.194.175.80 sport=58681 dport=443 packets=4
bytes=172 src=207.194.175.80 dst=192.168.1.67 sport=443 dport=58681 packets=5 bytes=563
[ASSURED] mark=0 qosconnmark=0x0 delta-time=6 use=1
udp 17 4 src=192.168.2.10 dst=172.217.3.170 sport=54585 dport=443 packets=1 bytes=1378
src=172.217.3.170 dst=192.168.1.67 sport=443 dport=54585 packets=2 bytes=2756 [ASSURED]
mark=0 qosconnmark=0x0 delta-time=7 use=1
udp 17 24 src=192.168.2.10 dst=192.168.2.255 sport=137 dport=137 packets=27 bytes=2106
[UNREPLIED] src=192.168.2.255 dst=192.168.2.10 sport=137 dport=137 packets=0 bytes=0
mark=0 qosconnmark=0x0 delta-time=26 use=1
```

FIG. 1

```
dnsmasq: 66 fde1::7c55:a219:0:70e1:ed4:4e3f:8da2/59482
reply a-0003.a-msedge.net is 204.79.197.203
dnsmasq: 70 fde1::7c55:a219:0:70e1:ed4:4e3f:8da2/52144
reply dual-a-0001.a-msedge.net is 204.79.197.200
dnsmasq: 70 fde1::7c55:a219:0:70e1:ed4:4e3f:8da2/52144
reply dual-a-0001.a-msedge.net is 13.107.21.200
dnsmasq: 71 fde1::7c55:a219:0:70e1:ed4:4e3f:8da2/50339
reply dual-a-0001.a-msedge.net is 2620:1ec:c11::200
```

METHOD AND APPARATUS FOR MANAGING INTERNET PROTOCOL FLOW RECORDS IN A WIRELESS COMMUNICATION NETWORK

FIELD OF THE INVENTION

The present invention pertains to the field of network communication and in particular to a method and apparatus for managing internet protocol (IP) flow records in a wireless communication network.

BACKGROUND

It is well known that an increasing number of devices are connected to the internet around the world. In fact, 31 billion IoT (internet of things) devices are expected to be installed and connected in the network in 2020. Upon the increase in the number of connected IoT devices, concerns for privacy and security risks are growing dramatically.

Attempts have been made to resolve the issues of privacy and security risk in networking. One of the popular approaches for the wired service providers is monitoring of IP flows, for example, using Netflow and internet protocol flow information export (IPFIX) protocols. Using this approach, wired service providers are not able to see what is going through a gateway from end users, as network data transmits directly from the end users to the connected IP addresses.

The Netflow and IPFIX protocols allow information, such as IP addresses and quantity of data, to be sent to a cloud server for analysis. If the customer operates a large number of remote devices, the information can be analyzed to find out the destination and the amount of data transmissions as the transmissions occur. Without such analyses, there can be situations that a user realises excessive network usage only through monthly billings. Moreover, the Netflow and IPFIX protocols can also block malicious websites, which may be performed by the cloud analysis software which can send a gateway a command to block communication with the malicious website, where the gateway serves the end remote device that attempts to access the malicious website.

Benefits of the Netflow and IPFIX protocols have led many original equipment manufacturer (OEM) providers (e.g. OEM network router providers) in the fixed or wired domain to rely on these protocols. These protocols are designed for fixed router, such as in aggregation and core networks, using Ethernet as local area network (LAN)/wide area network (WAN) transport. Hence, there is no restriction imposed on the data usage, and therefore, multiple control and data packets can be exchanged between the device and the server to collect the plurality of records relating to IP flow.

However, problems exist for wireless gateways that connect to the cloud (e.g. cloud server, cloud application) by a cellular connection. Contrary to wired network routers which have almost unlimited communication capacity with low cost, mobile routers using cellular WAN, are restricted regarding the amount of data usage, primarily based on cost. The amount of raw IP addresses and data quantity information created from the existing Netflow and IPFIX protocols may be substantial in order to continuously maintain the reporting. This can be a significant issue when there is only limited network capacity. However, if information is queried selectively to save cellular bandwidth, for example in discrete time samples, using the existing Netflow and IPFIX protocols, the query result may provide only a snapshot of the current activity. In such cases, important details may be omitted or missed relating to what has happened since the last query.

Therefore there is a need for a method and apparatus for managing internet protocol (IP) flow records in a wireless communication network, that is not subject to one or more limitations of the prior art.

This background information is provided to reveal information believed by the applicant to be of possible relevance to the present invention. No admission is necessarily intended, nor should be construed, that any of the preceding information constitutes prior art against the present invention.

SUMMARY

An object of embodiments of the present invention is to provide a method and apparatus for management of internet protocol (IP) flow records in a wireless communication network.

In accordance with embodiments of the present invention, there is provided a method for managing internet protocol (IP) flow records in a wireless communication network. The method includes collecting, for a predetermined period of time, a plurality of IP flow records; each IP flow record being identified based on a source IP, a destination IP, a destination port and a protocol. The method further includes creating and assigning a unique hash value to each IP flow record. In addition, the method includes aggregating the plurality of IP flow records into one or more groups of IP flow records, each group of IP flow records having a same identifier, wherein the identifier is one of source IP, destination IP, destination port and protocol. The method further includes transmitting the groups of IP flow records for evaluation.

In some embodiments, the method further includes collecting additional IP flow records over an additional period of time. In some embodiments, the IP flow records are updated using a sliding time window. In some embodiments, the method further includes storing one or more of the plurality of IP flow records for a grace period. In some embodiments, the unique hash value is derived from one or more of the source IP, destination IP, destination port and protocol associated with the IP flow record.

In accordance with embodiments of the present invention, there is provided a gateway for managing internet protocol (IP) flow records in a wireless communication network. The gateway includes a processor and a memory storing thereon machine readable instructions. The instructions when executed by the processor configure the gateway to collect for a predetermined period of time, a plurality of IP flow records; each IP flow record being identified based on a source IP, a destination IP, a destination port and a protocol and create and assign a unique hash value to each IP flow record. The instructions, when executed by the processor further configure the gateway to aggregate the plurality of IP flow records into one or more groups of IP flow records, each group of IP flow records having a same identifier, wherein the identifier is one of source IP, destination IP, destination port and protocol and transmit the groups of IP flow records for evaluation.

Embodiments have been described above in conjunction with aspects of the present invention upon which they can be implemented. Those skilled in the art will appreciate that embodiments may be implemented in conjunction with the aspect with which they are described, but may also be implemented with other embodiments of that aspect. When embodiments are mutually exclusive, or are otherwise incompatible with each other, it will be apparent to those skilled in the art. Some embodiments may be described in relation to one aspect, but may also be applicable to other aspects, as will be apparent to those of skill in the art.

BRIEF DESCRIPTION OF THE FIGURES

Further features and advantages of the present invention will become apparent from the following detailed description, taken in combination with the appended drawings, in which:

FIG. 1 illustrates an example of IP flow records captured for one network browsing session.

It will be noted that throughout the appended drawings, like features are identified by like reference numerals.

DETAILED DESCRIPTION

The present disclosure provides a method and apparatus for managing internet protocol (IP) flow records in a wireless communication network. The method and apparatus can provide for compression and aggregation of internet protocol (IP) flow records in order to reduce the amount of IP flow reporting traffic, especially in environments where network capacity and resources for wireless connection to cloud servers are limited (i.e. bandwidth and/or cost-constrained environment). Embodiments of the present disclosure provide a system that efficiently tracks data flows for constrained internet of things (IoT) devices and deployments that can be used for management and anomaly detection. The system can provide the network administrator with control over what websites can be accessed by users behind the gateway (e.g. local area network (LAN) clients) and monitor how much bandwidth can be utilized by the users in order that a proper bandwidth restriction can be imposed in consideration of quality of service (QoS) policies.

Embodiments of the present disclosure also resolve security risks and privacy concerns at a lower bandwidth and/or data cost. According to embodiments, the system can provide substantial information about data traffic in the network and behind the gateway enabling actions to be taken if necessary. Specifically, details or information regarding what is going on in the network and behind the gateway can be used for anomaly detection in order that malicious software installed in the gateway, which attempts to send sensitive and private information to adversarial parties (e.g. hackers), can be detected. The information can also be used to detect the presence of any adversarial parties behind the gateway trying to cause distributed denial-of-service (DDoS) attacks, for example, on public Wi-Fi networks.

According to embodiments, there is provided a method and apparatus for management of internet protocol (IP) flow records in a wireless communication network. The method includes collecting for a predetermined period of time, a plurality of IP flow records; each IP flow record being identified based on a source IP, destination IP, destination port and protocol. The method further includes creating and assigning a unique hash value to each IP flow record. In some embodiments, the unique hash value is derived from one or more of the source IP, destination IP, destination port and protocol. The method further includes aggregating the plurality of IP flow records into one or more groups of IP flow records, each group of IP flow records having a same identifier, wherein the identifier is one of source IP, destination IP, destination port and protocol. The method further includes transmitting using the wireless communication network, the groups of IP flow records for evaluation. According to some embodiments, by the compression of the IP flow header information based creation and assignment of a unique hash value, and the further aggregation of the plurality of IP flow records into groups, the data size associated with the transmission of the groups of IP flow records can be reduced, thereby mitigating potential issues with bandwidth associated with a wireless communication network.

According to some embodiments, data (for example information desired by the user) including those for the new sessions is compressed at the source itself. This compression can be performed without using additional network or resources (e.g. CPU resources). In this manner the data provided is the complete data and not merely snap shots of the data at periodic times.

According to embodiments, various sessions or IP flow records are aggregated in or combined into one or more unique sessions. Moreover, according to embodiments, real-time flow information can be updated using a sliding window algorithmic approach without losing record data (e.g. sessions in between the updates are not lost). According to some embodiments, IP flow records are maintained to fetch real-time updates.

FIG. 1 illustrates an example of IP flow records captured for one network browsing session. It may be noted that FIG. 1 only illustrates part of the IP flow records generated for the browsing session performed. It may be further noted that the browsing (e.g. visiting a variety of websites by the user) is performed using a host laptop (Windows® 10, IP address 192.168.2.10). The host laptop is connected to the Lexus™ gateway (Airlink® OS-LAN IP 192.168.2.1 and WAN IP 192.168.1.67), and the gateway is connected to a home router via Wi-Fi. For FIG. 1, the IP flow records are captured using the conntrack Linux® tool.

With regards to the IP flow records illustrated in FIG. 1, a website (e.g. www.msn.com) is visited or accessed through a web browser (e.g. Google Chrome®) and 36 public IP flow records were created for this one browsing session. Part of these public IP flow records are shown in FIG. 1.

When the Netflow or IPFIX protocol (Internet Engineering Task Force (IETF) standard) is used, there are 36 unique IP flow records for the above browsing session. As an example, according to the Netflow or IPFIX protocol, each record would be uniquely identified based on the 5 tuples. TABLE 1 illustrates a unique IP flow header defining the 5 tuples in the right column.

TABLE 1

| Unique IPFIX/Netflow record header (5 tuples) | 1. Source IP 2. Destination IP 3. Source Port 4. Destination Port 5. Protocol |
|---|---|

Referring to TABLE 1, the length of each of the header fields are 4 bytes for source IP, 4 bytes for destination IP, 2 bytes for source port, 2 bytes for destination port, and 2 bytes for protocol. Accordingly, the total number of bytes to uniquely identify each IP flow record using the Netflow/IPFIX protocol would be 14 bytes (i.e. 4+4+2+2+2=14 bytes).

Put another way, in order to send the activity report for one browsing session for one website (e.g. www.msn.com), 36 unique IP flow records would be constructed and the total size of the header would be 504 bytes (i.e. 36×14=504 bytes). Each of the IP flow records can include various information depending on what information is needed by the user. An example of the information that can be acquired from the IP flow record is illustrated in TABLE 2, which defines record data that is unique per record.

TABLE 2

| Record Data unique per record | 1. Number of packets received<br>2. Number of packets sent<br>3. Number of bytes received<br>4. Number of bytes sent<br>5. Timestamp at which the session started<br>6. Timestamp at which the session ended<br>7. Ingress interface<br>8. Egress interface, etc. |
|---|---|

In the case of a IPv6 (Internet Protocol version 6) record, the total number of bytes to uniquely identify each record would be 38 bytes (i.e. 16+16+2+2+2=38 bytes). Therefore, in order to send the same activity report for the same website browsing session (e.g. www.msn.com), the length of the header of length 1368 bytes (i.e. 36×38=1368 bytes).

In furtherance of the above, if a user browses 10 different websites, 10 times in 15 minutes, the total size of the header would be 50400 bytes (i.e. 10×10×504=50400 bytes) for IPv4 and 136800 bytes (i.e. 10×10×1368=136800 bytes) for IPv6. It should be noted that the aforementioned sizes are just for the header, and substantially more data usage would be required to provide the various types of information desired by the user, for example the information noted in TABLE 2.

The present disclosure provides a method and apparatus for the management of IP flow records in a wireless communication network. There is provided a method and apparatus for compression and aggregation of IP flow records in order to reduce the amount of IP flow reporting traffic, especially in environments where network capacity and resources are limited for wireless connection to cloud servers (i.e. bandwidth and/or cost-constrained environment). According to embodiments, the IP flow records are compressed through two compression stages thereby significantly reducing the size of the header and data (e.g. information desired by the user). In an exemplary case, the compressed size of the header and data may be reduced to 0.11% of the size of the original header and data.

According to embodiments, in the first compression stage, each of unique IP flow records may be identified based on 4 tuples, instead of 5 tuples as is done using the Netflow/IPFIX protocol. The four (4) tuples for defining an IP record include source IP, destination IP, destination port and protocol. It has been realized that this identification of an IP record is suitable as a source port (which is used is as a 5$^{th}$ tuple in the Netflow/IPFIX protocol) is randomly selected by a browser (or other application) when sending traffic to the webserver. As such, the source port is not required to uniquely identify the flow unless it is for control protocols (e.g. border gateway protocol (BGP)).

According to embodiments, in the first compression stage, the destination IP is resolved based on the DNS (domain name system) cache and a unique hash value (e.g. SHA (secure hash algorithm) hash value) to identify each record that is generated.

Figure 2:
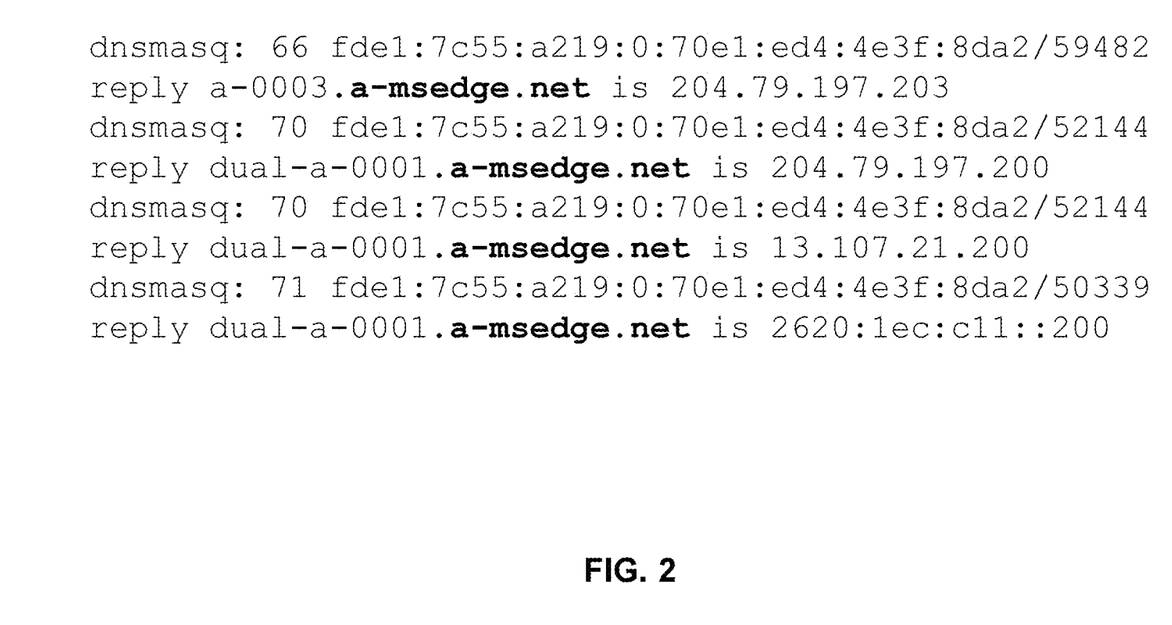
FIG. 2 illustrates an example of log entries derived from session browsing responses.

According to embodiments, the DNS cache may be built using responses received upon a browsing session. It may be noted that all responses received upon a browsing session can be logged using an application or software such as 'dnsmasq'. As such, when a user browses a website (e.g. www.msn.com), all resolved IPv4 and IPv6 addresses can be cached. Using the cached IPv4 and IPv6 addresses, DNS cache can be built with a unique domain name (for example as a key) and IPv4/IPv6 addresses (for example as values). An example of log entries derived from browsing session responses is shown in FIG. 2. Referring to FIG. 2, 'a-msedge.net' is the key and there are 4 different IPv4/IPv6 addresses associated with this key.

In some embodiments, the domain name of the website (or destination) can be obtained from the DNS cache. Specifically, for example, when aggregating multiple Linux® IP flows, the source port is first removed from the IP flow record, then the domain name is obtained from the DNS cache through reverse mapping of the destination IP (IPv4 or IPv6). It should be noted that this may be applicable only for destinations for which a user has typed the domain name. In case a user types the IP address of the destination directly, the destination IP address can be simply encoded unless the destination is one of the known ones, and optionally the destination IP may be marked as of-interest for the future resolution, for example relating to the address.

In some embodiments using ethernet that is typically not restricted on the bandwidth or data usage, the DNS cache may be built at 3 levels. For example, in case of log entries provided in FIG. 2, the key would be 'a-msedge.net'; the values would be '204.79.197.203', '204.79.197.200', '13.107.21.200' and '2620:1ec:c11::200'; and the resolved service provider would be 'Microsoft Corporation'. In this way, multiple other IPs belonging to the same service provider (e.g. 'Microsoft Corporation' in this case) can be further aggregated. As such, in some embodiments, an active WAN interface, that is connected to the internet but not using a cellular connection, may be used to build a DNS cache by resolving IP addresses to their service providers.

Regarding the hash value, according to embodiments, a unique hash value can be generated and used to send compressed IP flow information. The generated unique hash value includes a source IP, destination domain (or IPv4/IPv6 in case the domain is not resolved), destination port and protocol. In some embodiments, the hash value is generated based on the SHA-1 and is therefore 20 bytes long (e.g. SHA_DIGEST_LENGTH). However, it should be noted that other algorithms such as SHA-256, SHA-384 or SHA-512 can be used to generate the hash value. In various embodiments, irrespective of whether the IP is IPv4 (where the IP length is 4 bytes) or IPv6 (where the IP length is 16 bytes), the hash value may be kept constant.

In various embodiments, the hash value can be computed at the source (e.g. end device) and at the destination (e.g. cloud application) using the 4 tuples when a unique IP flow is received for the first time. Next time onwards, there is no need to send the 4 tuples (e.g. source IP, destination domain (or IPv4/IPv6 in case the domain is not resolved), destination port, and protocol) to the destination (e.g. cloud application) for subsequent updates. Instead, only the hash value (e.g. SHA-1 hash value) can be sent as the hash value can be sufficient for identifying the unique IP flow and updating the received statistics information. In this way, the bandwidth needed for updating existing flows can be further reduced. Furthermore, if the destination (e.g. cloud application) does not have the previous entry in the database, for example due to data loss, the destination can query the device to fetch the 4 tuples for a non-existing hash value entry received in subsequent updates.

According to embodiments, IP flow records can be aggregated in or combined into one or more unique records, in order to reduce the redundancy (in both header size and data), for example when reporting IP flow statistics. TABLE 3 illustrates grouping of IP flow records for compression according to embodiments.

TABLE 3

| Record # | Source IP | Destination IP | Dest. Domain Name | Dest. Port | Protocol |
|---|---|---|---|---|---|
| 1 | 192.168.2.10 | 207.194.175.80, 23.73.20.41, 207.194.175.122, 207.194.175.80, 23.73.60.142, 23.73.60.142, 207.194.175.122, 207.194.175.80, 204.79.197.203, 207.194.175.75 | Akamai | 443 | TCP |
| 2 | 192.168.2.10 | 172.217.14.227, 172.217.14.228, 216.58.217.42, 216.58.193.67, 216.58.193.74, 172.217.3.163, 172.217.14.227, 172.217.3.174, 172.217.14.228, 172.217.3.170, 172.217.14.195, 172.217.14.238, 172.217.14.206, 172.217.3.170, 216.58.193.77, 216.58.193.78, 216.58.193.78, 172.217.14.206 | Google | 443 | TCP |
| 3 | 192.168.2.10 | 40.90.22.192, 64.4.54.254, 204.79.197.200 | Microsoft | 443 | TCP |
| 4 | 192.168.1.67 | 95.216.24.230 | Unresolved | 123 | UDP |

Referring to the example illustrated in TABLE 3, there are only 4 unique records as a result of aggregation of the 36 IP flow records. Hence, the size of the header can be significantly reduced to 56 bytes (i.e. 4×14=56 bytes) for IPv4 or 152 bytes (i.e. 4×38=152 bytes) for IPv6. Therefore, the compression of the headers in the first stage alone provides a compression ratio of 11%, compared to the original header size (i.e. 56/504×100=11% for IPv4, 152/1368×100=11% for IPv6). In addition to header compression, the desired data (e.g. example data enumerated in TABLE 2) can also be aggregated for the same IP flow records.

According to embodiments, in a second compression stage, IP flow records may be continuously collected for a certain period of time. The user may open and close the browsing session multiple times during this time period. In some embodiments, the time period for collecting data can be configured by the user. Then, all IP flow records collected during this time period, including both the header and data (e.g. header and data illustrated in TABLES 1 and 2, respectively), are also aggregated together.

According to embodiments, the second compression stage can further compress the size of the header and data, for example, to 0.11% of the original header and the original data. For instance, in light of the example used for the first compression stage, when a user browses (or accesses) each of 10 different websites 10 times in a certain time period (e.g. 15 minutes), the total size of the headers would be 5600 bytes (i.e. 10×10×56=5600 bytes) for IPv4 or 15200 bytes (i.e. 10×10×152=15200 bytes) for IPv6, after the first compression stage but before the second compression stage. At this point, without the second compression, the compression ratio is 11%, compared to the original header size and the original data size, respectively.

According to embodiments, during the second compression, each unique session in which IP flow records have previously been aggregated based on the unique 4 tuples, will be counted as a single record irrespective of the number of times that the user accessed the particular website (e.g. opened and closed the session) during the time period (e.g. 15 minutes). As such, the total number of records in the time period (e.g. 15 minutes) will remain at 4. Similarly, the total number of bytes for the overall header length would remain at 56 bytes for IPv4 and 152 bytes for IPv6. Therefore, the total compression ratio achieved after the second compression stage would be 0.11% (i.e. (56/50400)×100=0.11% for IPv4, (152/136800)×100=0.11% for IPv6), compared to the original header size and data size.

It should be noted that the compression ratio of 0.11% is exemplary for a web browsing session that opens many connections as illustrated above. In case of a web browsing session that only opens one or a few IP addresses (e.g. industrial traffic), it will be understood that same compression ratio may not be achieved. In other words, the compression ratio may be determined based at least partly on the number of IP addresses or connections that are opened during the web browsing session.

According to embodiments, subsequent updates regarding the IP flow records do not require the header information, if it was sent previously. Instead, the hash value (e.g. SHA hash value) of the header (16 bytes) may be sufficient to uniquely identify the record. In addition, if for example, the record using the (SHA) hash value is not found, the apparatus can query the device (e.g. the user device) to send the header information in a separate request.

According to embodiments, data (e.g. information desired by the user) is compressed including those for the new sessions at the source itself without using additional network capacity or resources (e.g. CPU resources).

According to embodiments, the method and apparatus can resolve security risks and privacy concerns via anomaly detection. Anomaly detection can identify websites and/or items that raise suspicion by differing significantly from normal data. For example, referring to the example illustrated in TABLE 3 (i.e. browsing the website www.msn.com), it is reasonable that the traffic destination is Google, Microsoft, or Akamai (i.e. record number 1 to 3 in TABLE 3). However, the unresolved traffic destination (i.e. the record number 4 in TABLE 3) may be considered suspicious and therefore this destination can be considered as an outlier for further scrutiny. This is further illustrated in TABLE 4 which shows additional scrutiny of the outlier record in accordance with embodiments.

TABLE 4

| Record # | Destination IP | Domain Name | After scrutiny |
|---|---|---|---|
| 4 | 95.216.24.230 | Unresolved | Hetzner Online GmbH - Germany Destination Port = 123 (i.e., NTP). |

According to embodiments, IP flow records can be maintained in order to fetch real-time updates, without losing record data. This fetching of updates can be performed using the sliding window algorithmic approach (e.g. sessions in between the updates are not lost).

For example, IP flow records (e.g. conntrack sessions in Linux®) are purged after the session times out. In case of UDP (user datagram protocol) sessions, for example, the time out period is of 30 seconds. Therefore, details about the IP flows may not be provided when fetching real-time sessions from the Linux® conntrack table, as the IP flow records have been recently purged.

According to embodiments, in order to overcome such challenges, each IP flow will stay for an additional grace period in the local database (e.g. local database in Airlink® OS, e.g., local memory of the wireless gateway e.g. Airlink®). In some embodiments, the grace period may be configured by the user, for example as an 'IP flow interval'. In some embodiments, the default value of the grace period can be defined as 15 minutes, however it will be readily understood that other default values can be defined. In various embodiments, the IP flow records in the local database are maintained as a sliding window, for example a sliding time window.

Figure 3:
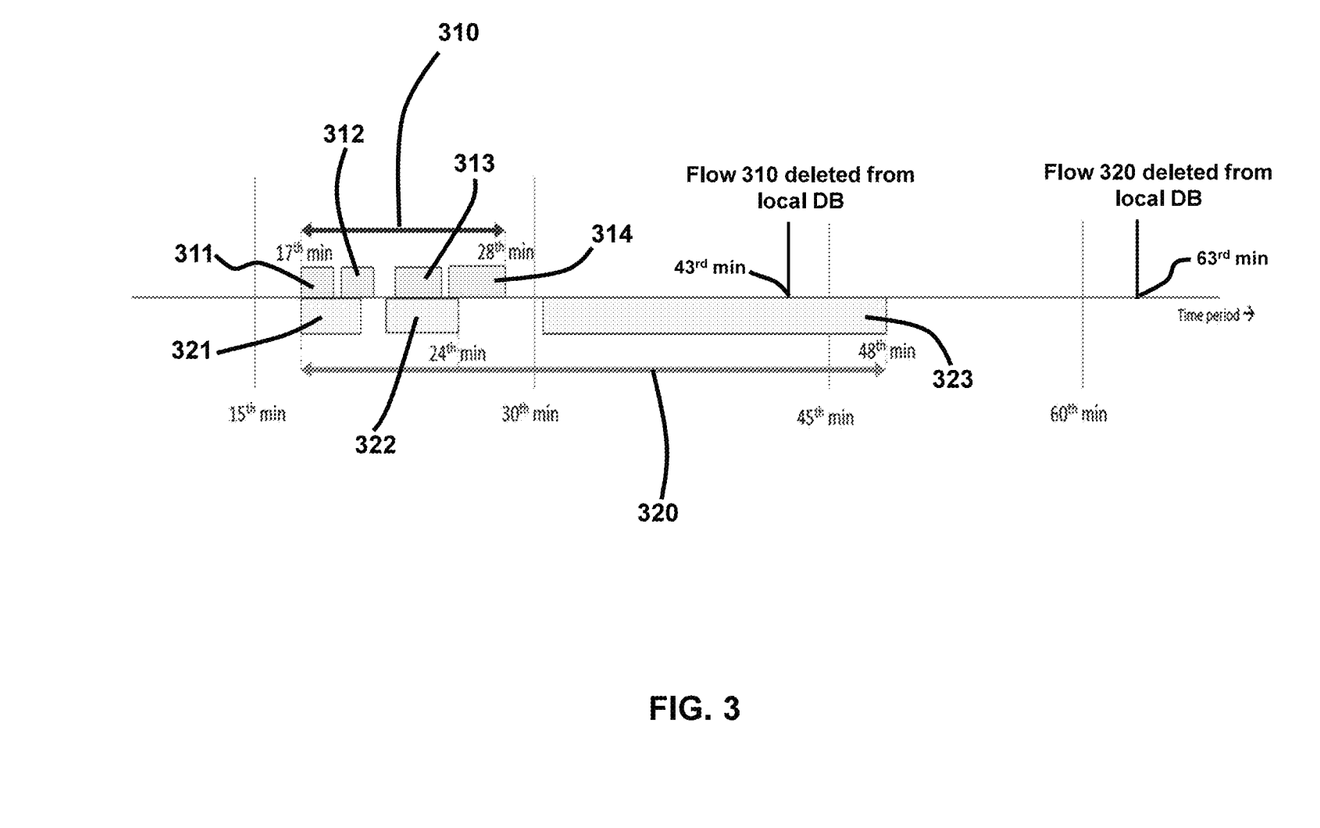
FIG. 3 illustrates, in a time graph, an example of managing IP flow records over a time period, in accordance with embodiments of the present disclosure.

FIG. 3 illustrates, in a time graph, an example of managing IP flow records over a time period, in accordance with embodiments of the present disclosure. Referring to FIG. 3, there are two IP flows 310 and 320. The IP flow 310 includes 4 conntrack sessions 311, 312, 313 and 314. The first conntrack session 311 was created at the $17^{th}$ minute and the last conntrack session 314 was purged out at the $28^{th}$ minute. The IP flow 320 includes 3 conntrack sessions 321, 322 and 323. The first conntrack session 321 was created at the $17^{th}$ minute and the last conntrack session 323 was purged out at the 48th minute.

Further referring to FIG. 3, if a user looks up into the Linux® conntrack table at the $30^{th}$ minute, there will be no active sessions available and therefore the user will have no idea about the recent IP flows. According to embodiments, an additional time period (i.e. grace period) is defined in order to maintain the IP flow records for an additional period of time. In some embodiments, provision of the grace period is associated with the operating system associated with the wireless connection device (e.g. the operating system associated with the gateway or mobility router, e.g. Airlink® OS).

In the example illustrated in FIG. 3 (i.e. the user looks up into the Linux® conntrack table at the $30^{th}$ minute), as the $4^{th}$ conntrack session notification (i.e. DESTROY) for the IP flow 310 is received at the $28^{th}$ minute, the record for the IP flow 310 will remain in the local database until the $43^{rd}$ minute (i.e. 28+15=$43^{rd}$ minute). Here, the grace period (i.e. IP flow interval) is 15 minutes. Similarly, the $2^{nd}$ conntrack session notification (i.e., DESTROY) for the IP flow 320 is received at the $24^{th}$ minute, so the IP flow 320 will remain in the local database until the $39^{th}$ minute (i.e. 24+15=$39^{th}$ minute). Here again, the grace period (i.e. IP flow interval) is 15 minutes. Therefore, when the user looks up in order to find real-time updates of IP flows 310 and 320 at the $30^{th}$ minute, the user can see the recent records of the two IP flows 310 and 320, as they are still maintained in the local database.

However, if the user looks up into the Linux® conntrack table at the $45^{th}$ minute, the user would only be able to see the recent records of the IP flow 320. At the 45th minute, IP flow 310 will be deleted from the local database (e.g. local memory) as IP flow 310 is not refreshed within the grace period of 15 minutes (e.g. as no conntrack sessions were defined in the 15 minutes before the $43^{rd}$ minute). As such, in the next period update at the $45^{th}$ minute, only IP flow 320 will be defined or available.

According to embodiments, the periodic updates will have byte and packet count values obtained and defined based on a time period from the beginning of the IP flow. In other words, the byte and packet count values will not be computed when updating the periodic flows. For example, if the IP flow 320, which started at the $17^{th}$ minute, receives 40 packets between the $15^{th}$ and $30^{th}$ minutes and 42 packets between the $30^{th}$ and $45^{th}$ minutes, the periodic updates at the $30^{th}$ minute will identify 40 packets and the periodic update at the $45^{th}$ minute will identify 82 packets. That is, the byte and packet count values for periodic updates would be calculated based on the time period since the start of the IP flow or counted from the beginning of the IP flow, but not calculated for each time interval.

Further referring to FIG. 3, IP flow 310 starts its first session at the $17^{th}$ minute and ends its last session at the $28^{th}$ minute. Therefore, if the data (e.g. data in tree manager/ALMS) is defined at the $30^{th}$ minute, IP flow 310 will have its start time as the 17th minute and its end time as the $28^{th}$ minute. According to embodiments, Rx (reception)/Tx (transmission) bytes and Rx/Tx packets of all 4 conntrack sessions (i.e. conntrack sessions 311, 312, 313 and 314) would be aggregated for bi-directional traffic.

In the case of IP flow 320, IP flow 320 starts its first session at the $17^{th}$ minute and ends its last session at the $48^{th}$ minute. Therefore, if the data (e.g. data in ALMS) is defined at the $30^{th}$ minute, IP flow 320 will have its start time as the $17^{th}$ minute and its end time as the $24^{th}$ minute as that is the time when the second conntrack session is deleted from the Linux® conntrack table. Also, IP flow 320 will be marked as stale before it is deleted at the $39^{th}$ minute (i.e. 24+15=$39^{th}$ minute). According to embodiments, Rx/Tx bytes and Rx/Tx packets of only two conntrack sessions (i.e. conntrack sessions 321 and 322) would be aggregated for bi-directional traffic.

If the periodic update is performed at the $45^{th}$ minute, IP flow 320 will have its start time as $17^{th}$ minute, as it is when the first conntrack session is defined for this flow, and its end time as the $45^{th}$ minute as that is when this flow is reported or defined. Further, at the $45^{th}$ minute, IP flow 320 is still active and the conntrack session (i.e. conntrack session 323) has not yet been purged.

Finally, if the periodic update is performed at the $60^{th}$ minute, IP flow 320 will have its start time as the $17^{th}$ minute, as it is when the first conntrack session is defined for this flow, and its end time as the $48^{th}$ minute, as that is when the third conntrack session is deleted from the Linux® conntrack table. Also, IP flow 320 will be marked as stale before it is deleted at the $63^{rd}$ minute (i.e. 48+15=$63^{rd}$ minute).

Figure 4:
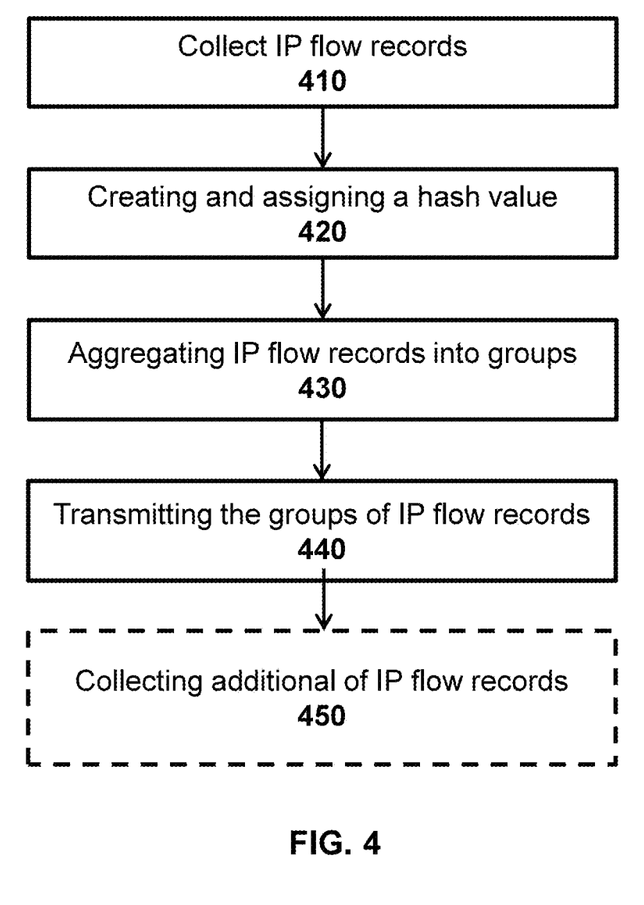
FIG. 4 illustrates a method for management of internet protocol flow records in a wireless communication network, in accordance with embodiments of the present disclosure.

According to embodiments, there is provided a method and apparatus for management of internet protocol (IP) flow records in a wireless communication network. With reference to FIG. 4, the method includes collecting 410, for a predetermined period of time, a plurality of IP flow records; each IP flow record being identified based on a source IP, destination IP, destination port and protocol. The method further includes creating and assigning 420 a unique hash value to each IP flow record. In some embodiments, the unique hash value is derived from one or more of the source IP, destination IP, destination port and protocol. The method further includes aggregating 430 the plurality of IP flow records into one or more groups of IP flow records, each group of IP flow records having a same identifier, wherein the identifier is one of source IP, destination IP, destination port and protocol. The method further includes transmitting 440, using the wireless communication network, the groups of IP flow records for evaluation. According to embodiments, by the compression of the IP flow header information based creation and assignment of a unique hash value, and the further aggregation of the plurality of IP flow records into groups, the data size associated with the transmission of the groups of IP flow records can be reduced, thereby mitigating potential issues with bandwidth associated with a wireless communication network.

In some embodiments, the method further includes collecting further IP flow records over an additional period of time. These further IP flow records being aggregated with the plurality of IP flow records for reduction of data size associated with a combination of the plurality of IP flow records and the further IP flow records.

Figure 5:
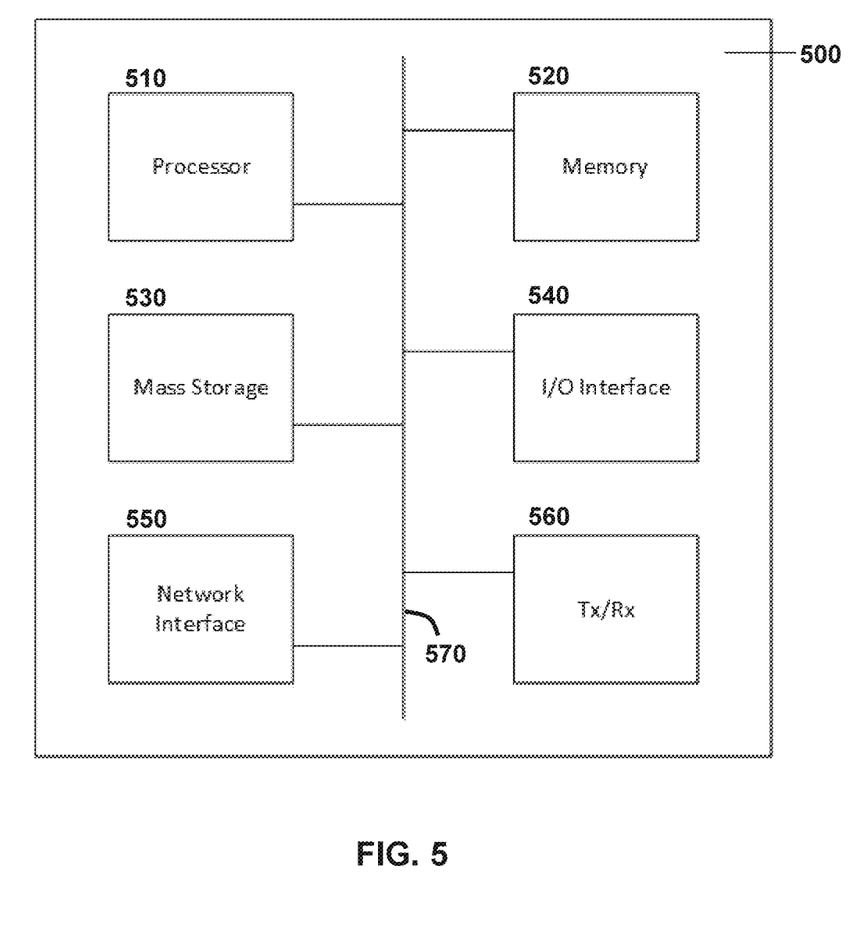
FIG. 5 is a schematic diagram of an electronic device according to embodiments of the present disclosure.

FIG. 5 is a schematic diagram of an electronic device 500 that may perform any or all of the steps of the above methods and features described herein, according to different embodiments of the present invention. For example, a wireless gateway or mobility router may be configured as the electronic device.

As shown, the device includes a processor 510, memory 520, non-transitory mass storage 530, I/O interface 540, network interface 550, and a transceiver 560, all of which are communicatively coupled via bi-directional bus 570. According to certain embodiments, any or all of the depicted elements may be utilized, or only a subset of the elements. Further, the device 500 may contain multiple instances of certain elements, such as multiple processors, memories, or transceivers. Also, elements of the hardware device may be directly coupled to other elements without the bi-directional bus.

The memory 520 may include any type of non-transitory memory such as static random access memory (SRAM), dynamic random access memory (DRAM), synchronous DRAM (SDRAM), read-only memory (ROM), any combination of such, or the like. The mass storage element 530 may include any type of non-transitory storage device, such as a solid state drive, hard disk drive, a magnetic disk drive, an optical disk drive, USB drive, or any computer program product configured to store data and machine executable program code. According to certain embodiments, the memory 520 or mass storage 530 may have recorded thereon statements and instructions executable by the processor 510 for performing any of the aforementioned method steps described above.

It will be appreciated that, although specific embodiments of the technology have been described herein for purposes of illustration, various modifications may be made without departing from the scope of the technology. The specification and drawings are, accordingly, to be regarded simply as an illustration of the invention as defined by the appended claims, and are contemplated to cover any and all modifications, variations, combinations or equivalents that fall within the scope of the present invention. In particular, it is within the scope of the technology to provide a computer program product or program element, or a program storage or memory device such as a magnetic or optical wire, tape or disc, or the like, for storing signals readable by a machine, for controlling the operation of a computer according to the method of the technology and/or to structure some or all of its components in accordance with the system of the technology.

Acts associated with the method described herein can be implemented as coded instructions in a computer program product. In other words, the computer program product is a computer-readable medium upon which software code is recorded to execute the method when the computer program product is loaded into memory and executed on the microprocessor of the wireless communication device.

Acts associated with the method described herein can be implemented as coded instructions in plural computer program products. For example, a first portion of the method may be performed using one computing device, and a second portion of the method may be performed using another computing device, server, or the like. In this case, each computer program product is a computer-readable medium upon which software code is recorded to execute appropriate portions of the method when a computer program product is loaded into memory and executed on the microprocessor of a computing device.

Further, each step of the method may be executed on any computing device, such as a personal computer, server, PDA, or the like and pursuant to one or more, or a part of one or more, program elements, modules or objects generated from any programming language, such as C++, Java, or the like. In addition, each step, or a file or object or the like implementing each said step, may be executed by special purpose hardware or a circuit module designed for that purpose.

It is obvious that the foregoing embodiments of the invention are examples and can be varied in many ways. Such present or future variations are not to be regarded as a departure from the spirit and scope of the invention, and all such modifications as would be obvious to one skilled in the art are intended to be included within the scope of the following claims.

We claim:

1. A method for managing internet protocol (IP) flow records in a wireless communication network, the method comprising:
    collecting, for a predetermined period of time, a plurality of IP flow records; each IP flow record being identified based on a source IP, a destination IP, a destination port and a protocol;
    creating and assigning a unique hash value to each IP flow record;
    aggregating the plurality of IP flow records into one or more groups of IP flow records, each group of IP flow records having a same identifier and counted as a single record, wherein the identifier is one of source IP, destination IP, destination port and protocol, wherein the IP flow records are maintained for a grace period to fetch real time updates without losing record data using a sliding time window defined by time windows associated with the IP flows, wherein the grace period starts at an end of a particular IP flow and a particular group of IP flow records are purged at an end of the grace period associated with a last IP flow record of the group of IP flow records;

when fetching of IP flow records is performed prior to purging, transmitting the groups of IP flow records for evaluation.

2. The method according to claim 1, further comprising collecting additional IP flow records over an additional period of time.

3. The method according to claim 1, wherein the unique hash value is derived from one or more of the source IP, destination IP, destination port and protocol associated with the IP flow record.

4. The method according to claim 1, further comprising storing one or more of the plurality of IP flow records for the grace period.

5. The method according to claim 4, wherein the grace period is a default grace period or the grace period is defined by a user.

6. The method according to claim 1, further comprising compressing one or more of the plurality of IP flow records at a source thereof.

7. The method according to claim 1, wherein the destination IP is resolved based on a domain name system cache.

8. A gateway for managing internet protocol (IP) flow records in a wireless communication network, the gateway comprising:
a processor; and
a memory storing thereon machine readable instructions, the instructions when executed by the processor configure the gateway to:
collect for a predetermined period of time, a plurality of IP flow records;
each IP flow record being identified based on a source IP, a destination IP, a destination port and a protocol;
create and assign a unique hash value to each IP flow record
aggregate the plurality of IP flow records into one or more groups of IP flow records, each group of IP flow records having a same identifier and counted as a single record, wherein the identifier is one of source IP, destination IP, destination port and protocol, wherein the IP flow records are maintained for a grace period to fetch real time updates without losing record data using a sliding time window defined by time windows associated with the IP flows, wherein the the grace period starts at an end of a particular IP flow and the groups of IP flow records are purged at an end of the grace period associated with a last IP flow record of the group of IP flow records;
when fetching of IP flow records is performed prior to purging, transmit the groups of IP flow records for evaluation.

9. The gateway according to claim 8, wherein the instructions when executed by the processor further configure the gateway to collect additional IP flow records over an additional period of time.

10. The gateway according to claim 8, wherein the unique hash value is derived from one or more of the source IP, destination IP, destination port and protocol associated with the IP flow record.

11. The gateway according to claim 8, wherein the instructions when executed by the processor further configure the gateway to store one or more of the plurality of IP flow records for the grace period in the memory.

12. The gateway according to claim 11, wherein the grace period is a default grace period or the grace period is defined by a user.

13. The gateway according to claim 8, wherein the instructions when executed by the processor further configure the gateway to compress one or more of the plurality of IP flow records at a source thereof.

14. The gateway according to claim 8, wherein the destination IP is resolved based on a domain name system cache.

* * * * *